(12) United States Patent
Gabsch et al.

(10) Patent No.: US 7,404,588 B2
(45) Date of Patent: Jul. 29, 2008

(54) VEHICLE DOOR

(75) Inventors: Steffen Gabsch, Cornberg (DE); Martin Voigt, Bad Salzdetfurth (DE); Rainer Klusmann, Fuldatal (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 144 days.

(21) Appl. No.: 10/534,816

(22) PCT Filed: Nov. 13, 2003

(86) PCT No.: PCT/EP03/12698

§ 371 (c)(1),
(2), (4) Date: Oct. 20, 2005

(87) PCT Pub. No.: WO2004/043722

PCT Pub. Date: May 27, 2004

(65) Prior Publication Data
US 2006/0145512 A1    Jul. 6, 2006

(30) Foreign Application Priority Data
Nov. 13, 2002   (DE)   ................ 102 53 636

(51) Int. Cl.
*B60J 5/00* (2006.01)
(52) U.S. Cl. .................................. 296/146.7
(58) Field of Classification Search ............. 296/146.7, 296/1.07; 49/502, 503, 460; 292/336.3
See application file for complete search history.

(56) References Cited

U.S. PATENT DOCUMENTS

| 2,668,730 | A | * | 2/1954 | De Vito ................ 292/336.3 |
| 2,723,872 | A | * | 11/1955 | Schonitzer et al. ......... 292/216 |
| 4,497,514 | A | * | 2/1985 | Moriya et al. ............ 292/336.3 |
| 4,580,822 | A | * | 4/1986 | Fukumoto ................ 292/336.3 |
| 5,282,657 | A | * | 2/1994 | Clinch et al. ............. 292/336.3 |
| 5,377,450 | A | * | 1/1995 | Varajon ....................... 49/502 |
| 5,462,482 | A | * | 10/1995 | Grimes ....................... 454/143 |
| 6,073,990 | A | | 6/2000 | Sauve |
| 6,106,005 | A | * | 8/2000 | Heinz et al. .............. 280/730.2 |
| 7,191,493 | B2 | * | 3/2007 | Vanderpool et al. .......... 16/412 |
| 7,204,530 | B2 | * | 4/2007 | Lee ........................... 292/336.3 |
| 2005/0230982 | A1 | * | 10/2005 | Lee ......................... 292/336.3 |

FOREIGN PATENT DOCUMENTS

| DE | 199 16 203 A1 | 5/2000 |
| DE | 100 48 567 C1 | 5/2002 |
| EP | 1 197 366 A2 | 4/2002 |

* cited by examiner

*Primary Examiner*—H Gutman
(74) *Attorney, Agent, or Firm*—Marshall & Melhorn, LLC

(57) ABSTRACT

The invention relates to a vehicle door having a lining that faces the passenger compartment of a motor vehicle. The lining can be joined to a bracket inside of which an actuating lever is mounted in a manner that enables it to swivel around a pin. A gap is provided at least in areas between the actuating lever and the lining. In addition, the pin is joined to the lining via fixing bearings.

12 Claims, 3 Drawing Sheets

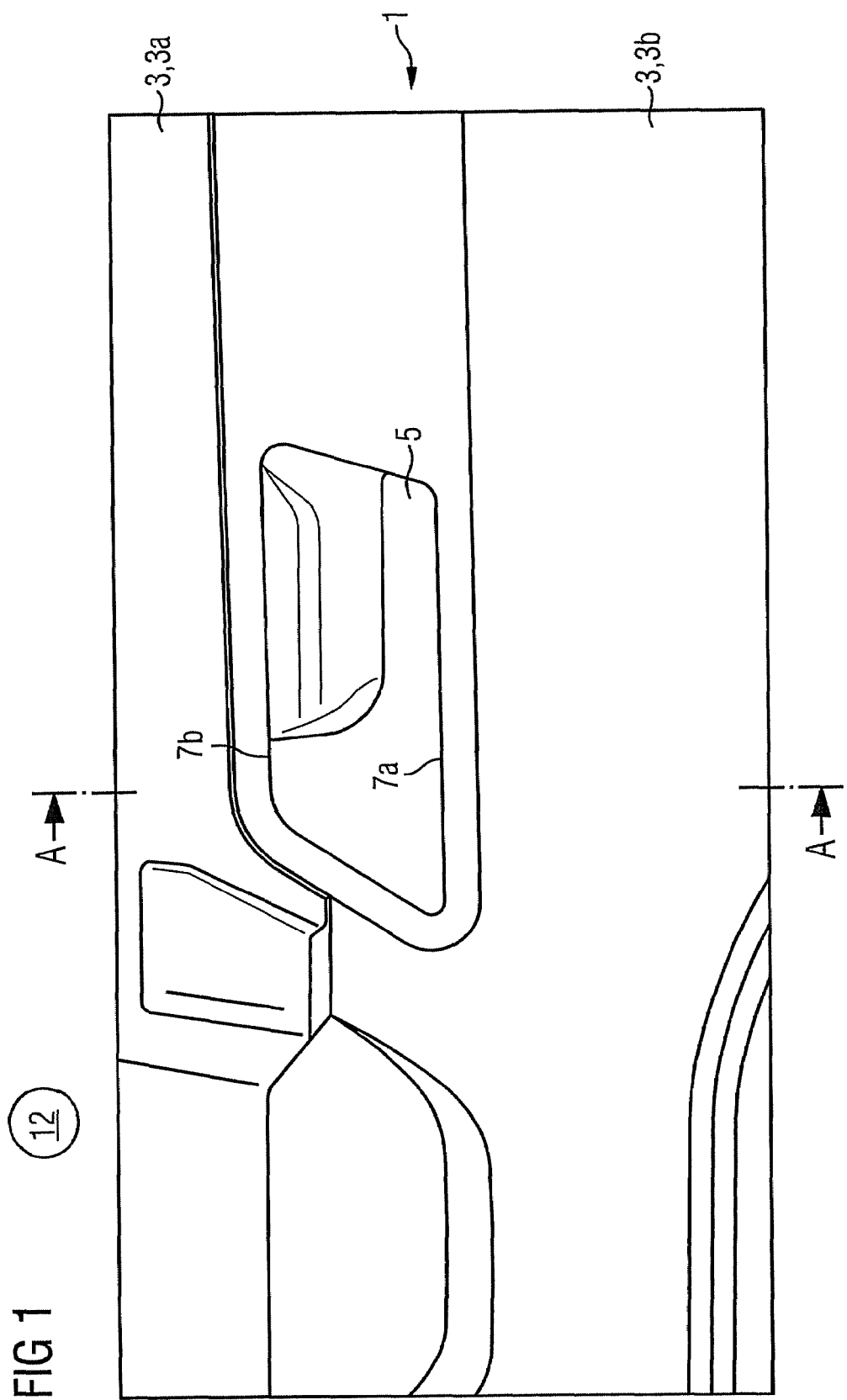

VEHICLE DOOR

BACKGROUND OF THE INVENTION

The present invention relates to a vehicle door.

Motor vehicle doors, for motor cars as well as for trucks, as a rule comprise trim facing towards the vehicle interior. These trims accommodate an actuation lever for the door opening, which is rotatably mounted about a pivot arbor in a bearing block belonging to the door. Here, usually a peripheral gap arises in the region between the actuation lever and the trim which encompasses this.

In particular with high-quality motor vehicles, it is important that no unsatisfactory gap appearance (gap which is too large, changing gap width) between the actuation lever and connecting parts of the trim occurs.

At the same time it is a problem that due to the fact that several components are involved, usually high manufacturing tolerances are set on all the individual components, so that when combined, an unsatisfactory gap appearance may result a later stage.

To solve this problem, it is possible to form a bearing block in a shell shape (thus quasi as a separate door inner trim), which engages behind the door inner trim towards the vehicle interior. Here only a gap between the actuation lever and the directly visible surrounding bearing block is created, and on account of the shortness of the tolerance chain, the gap appearance here is simple to realise. However with this, it is a problem that a relatively "clumsy" appearance arises which results from the protrusion of the bearing shell into the vehicle interior, and this hinders a harmonic overall appearance. Furthermore it is a problem that the bearing shells need to be manufactured of a relatively strong plastic which is cost-intensive and because of great demands on the surfaces, needs to be additionally painted, and in turn higher costs arise due to this.

It is of course also possible to shape the complete door inner trim of such a high-strength plastic (such as e.g. polyamide). However even greater manufacturing costs arise on account of this.

Another solution lies in the fact that due to "rolling" gaps between the actuation lever and the connecting trim, one succeeds in these not being conspicuous, even with uneven gaps. However the problem here is that the geometries of the door trim are very greatly restricted.

BRIEF SUMMARY OF THE INVENTION

The object of the present invention therefore lies in creating a door for motor vehicles which may be manufactured in an inexpensive manner and which fulfils the high demands with regard to the gap dimensioning.

This object can be achieved by a door for a vehicle with an interior and an exterior, which door comprises a trim facing toward the vehicle interior. The trim is connectable to a bearing block in which an actuation lever is pivotally mounted about a rotation arbor. A gap is, at least in regions, present between the actuation lever and the trim, and the arbor is additionally connected to the trim via fixation bearings.

Because of the fact that the arbor is additionally connected to the trim via fixation bearings, it is easily possible to achieve a uniform gap appearance. This is due to the fact that the tolerance chain is quasi "shortened", i.e. that an additional direct coupling between the trim and the arbor of the actuation lever is created (without the "detour" via the bearing block). Therefore, it is no longer necessary to demand that all components in a long tolerance chain have high manufacturing and gap tolerances in order as a whole to achieve a harmonic gap appearance. The reduction of the occurring tolerances is thus achieved without a limitation of the tolerance in manufacture.

Also, it is not necessary to manufacture the trim itself of a particularly stable expensive material. The fixation bearings assume merely the positioning or centering of the actuation lever to the connecting trim. The actual accommodation of force may take place in a conventional manner, e.g. via screw domes on that side of the trim which is distant to the motor interior. In particular with the solution according to the invention, is possible to fit the actuation lever into a trim in a flush manner. No bearing blocks etc. which project into the motor interior are required.

Advantageous formations of the present invention are specified in the dependent claims.

One advantageous further formation envisages the trim to be of polypropylene. This is a plastic capable of being manufactured inexpensively and which has a satisfactory surface quality without paint. This is particularly suitable for motor vehicles such as trucks, small buses, etc.

One further advantageous formation envisages the trim to be of several parts. This trim may e.g. consist of a first part and of a second part both of which comprise a surface directed towards the motor vehicle interior. In this manner it is easily possible to manufacture doors of two colours. The first and second part may e.g. consist in each case of differently coloured plastic and thus it is possible without expensive painting to influence the optical appearance of the door with regard to colour. Here it is particularly advantageous for the first part to be designed as an upper part which forms the inner breast or beltline of the motor vehicle door, and the lower part to be formed by a base carrier which, proceeding from the upper part, continues downwards to the door lower edge. This base carrier may contain openings for loudspeakers or rests, etc.

A particularly advantageous further formation envisages screw domes or likewise (rivet receivers etc.) being arranged on the second part of the trim, for fastening of the bearing block on the second part with a non-positive fit. Here it is essential that by way of this e.g. screw connection, only a tensioning takes place in order to hold the bearing block, and the actual geometric centering or exact definition of the position is accomplished by the fixation bearing indicated above. For this reason it is significant for these screw domes or likewise to have play in their condition of not being tightened so that depending on the setting of the additional fixation bearing, the screwing accommodating the force may be carried out in the different positions (a mechanical redundancy is avoided by way of this). It is particularly advantageous then on the first part of the trim, thus here e.g. of the window beltline or breast, to attach the fixation bearings for the unambiguous positioning of the arbor with respect to the trim.

This is also advantageous on assembly, thus the bearing block e.g. is introduced into the first part and positioned by way of this. For this the fixation bearings e.g. may have run-in chamfers. The screwing which is effected after this is however not significant with regard to the tolerance but merely serves for tensioning. It is yet to be emphasised that the fixation bearing ensures the actual centering or fixation or setting of the gap magnitude.

A further design envisages the bearing block being sunk with respect to the trim towards the vehicle exterior. By way of the fact that the bearing block or the trough for the actuation lever which contains it, into which e.g. an operators hand engages, does not protrude partly to the vehicle interior, this part does not also need to be painted or finished in any other manner in order to achieve demands set on the surface qualities, since the covered trough is practically not visible.

One advantageous design envisages the bearing block or the actuation lever being of polyamide. This plastic has good strength properties. E.g. the actuation lever may also be painted where there are very high demands on the surface.

A further advantageous design envisages the fixation bearings being designed as receivers open on one side. These may e.g. be "U" shaped, possibly with run-in chamfers and a locking bulge. By way of this it becomes possible to position the bearing block before it is then screwed to the trim in this position. A fastening of the arbor position in the axial direction is additionally possible.

Further advantageous designs of the present invention are specified in the remaining dependent claims.

BRIEF DESCRIPTION OF THE DRAWINGS

The invention is hereinafter explained by way of several figures. There are shown in:

FIG. 1 a view of a cut-out of a motor vehicle door according to the invention, from the motor vehicle interior, FIG. 2a a cross section through the motor vehicle door shown in FIG. 1, FIG. 2b a detailed view of a fixation bearing according to the invention, FIG. 3 an alternative embodiment with less favourable tolerance conditions.

DETAILED DESCRIPTION OF THE INVENTION

Figure 2A:
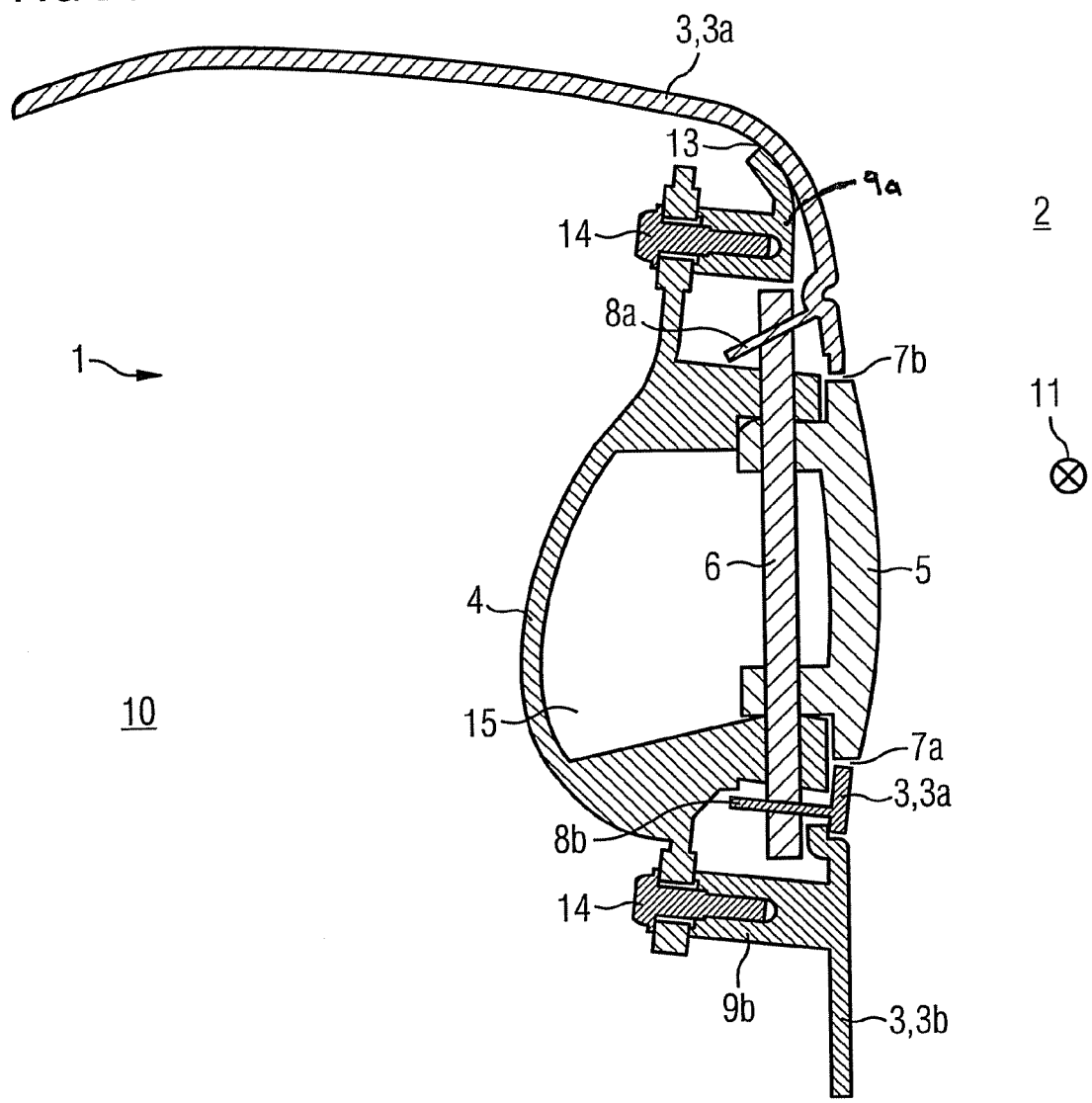

FIG. 1 shows a motor vehicle door 1 according to the invention which comprises a trim 3 facing towards the passenger space of a motor vehicle. The trim in FIG. 1 is seen from the vehicle interior, and the trim 3 is of two parts. The trim consist of an upper part 3a as well as of a lower part 3b which are firmly bonded or welded to one another. The upper part 3a forms a window breast or beltline towards the window 12 of the motor vehicle. The lower part forms a base carrier of the trim in which rests or a loudspeaker opening not shown in FIG. 1 are incorporated. The trim as a whole is fastened on a door module or a frame of a motor vehicle door. The parts 3a and 3b are in each case of unpainted polypropylene. Both parts are coloured with a different colour in that in the trim, a different colouring for the breast or beltline part and the base part results when viewed.

An actuation lever 5 mounted in an articulated manner is arranged surrounded by the upper part 3a. This actuation lever in regions forms a gap with the surrounding upper part 3a; this joint in its upper region is indicated at 7b and at its lower region at 7a.

It is the main aim of the present invention to design this gap over its whole length as uniformly as possible, wherein at the same time a uniform view is to result with as low as possible costs.

The actuation lever 5 is arranged essentially flush to the trim (see FIGS. 2a and 3), and below the actuation lever a trough belonging to the bearing block 4 is arranged into which an operator's hand may engage in order to grip behind the actuation lever 5.

The bearing block as well as the actuation lever 5 are of unpainted or painted polyamide.

FIG. 2a shows a cross section according to A-A (see FIG. 1) through the motor vehicle door according to the invention. Here a part of the motor vehicle door 1 is to be seen which comprises a trim 3 (consisting of the parts 3a and 3b) towards the passenger space 2 of the motor vehicle. The trim 3 may be connected to the bearing block 4, e.g. via screws. In the bearing block 4, the actuation lever 5 is pivotally mounted about a rotation arbor 6, wherein between the actuation lever 5 and the trim 3, a gap 7a and 7b is given at least in regions. The arbor 6 is additionally connected to the trim via fixation bearings 8a and 8b.

FIG. 2a is now explained in more detail after this general description. One may easily recognise that the trim 3 consist of the upper part 3a and the lower part 3b. The upper part 3a and the lower part 3b are e.g. welded to one another in the region 13. The lower part 3b comprises screw domes 9a and 9b into which screws 14 are screwed. These screws 14 engage behind bores in the bearing block 4 and thus in the firmly screwed condition fix the bearing block 4 on the screw dome 9a and 9b. The through-bores in the bearing block 4 have a larger diameter than the shanks of the screws 14 so that when the screws are not tightened, no exact geometric fixing of the bearing block 4 on the trim is given, but rather a coupling "having play".

The bearing block 4 comprises a trough 15 which is set back with respect to the motor vehicle interior 2. As a whole the bearing block 4 is sunk with respect to the trim towards the vehicle exterior, so that this is practically not visible from the interior. An arbor consisting of plastic or metal is mounted in the bearing block 4 via two through-openings, and is pivotally mounted with the actuation lever.

This arbor 6 is furthermore mounted in fixation bearings 8a and 8b. These fixation bearings 8a and 8b belong to the upper part 3a. Here for example it is the case of injection moulded webs of the upper part 3a.

Figure 2B:
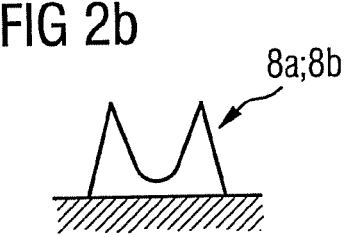

The fixation bearings 8a and 8b are designed e.g. as "U"-shaped receivers, thus open at one side (see FIG. 2b). These, as shown in FIG. 2b, may have run-in chamfers in the region of the limbs of the "U" and serve for fixing the arbor 6.

With the assembly of the subject shown in FIG. 2a, firstly the upper part 3a and the lower part 3b are welded into a finished trim. Then the actuation lever 5 via the arbor 6 is assembled in the bearing block 4. Then from the rear side of the trim (thus the direction of the reference numeral 10 in FIG. 2a) the bearing block 4 is fixed in that the arbor 6 is fixed in the fixation bearings 8a and 8b open towards the reference numerals. By way of this fixation, the geometric position of the arbor is exactly defined i.e. the axis is centred in an exact manner. In this position then the screws 14 are screwed through the through-openings of the bearing block 4 into the screw dome 9a and 9b and tightened so that a non-positive fitting fixation of the bearing block in the position predefined by the fixation bearing 8a and 8b is effected.

By way of the short "tolerance chain" between the actuation lever 5 as well as the trim 3 (or the upper part 3a), it is ensured that the gap 7a and 7b runs in a uniform manner also without great manufacturing and gap tolerances. Thus a harmonic appearance of the actuation lever arises in the trim, and this is the case with the gaps as well as for the flush incorporation of the actuation lever with respect to the trim. In FIG. 2a one may easily see that the actuation lever in the cross-sectional direction perpendicular to the vehicle longitudinal axis terminates essentially flush with the trim.

Figure 3:
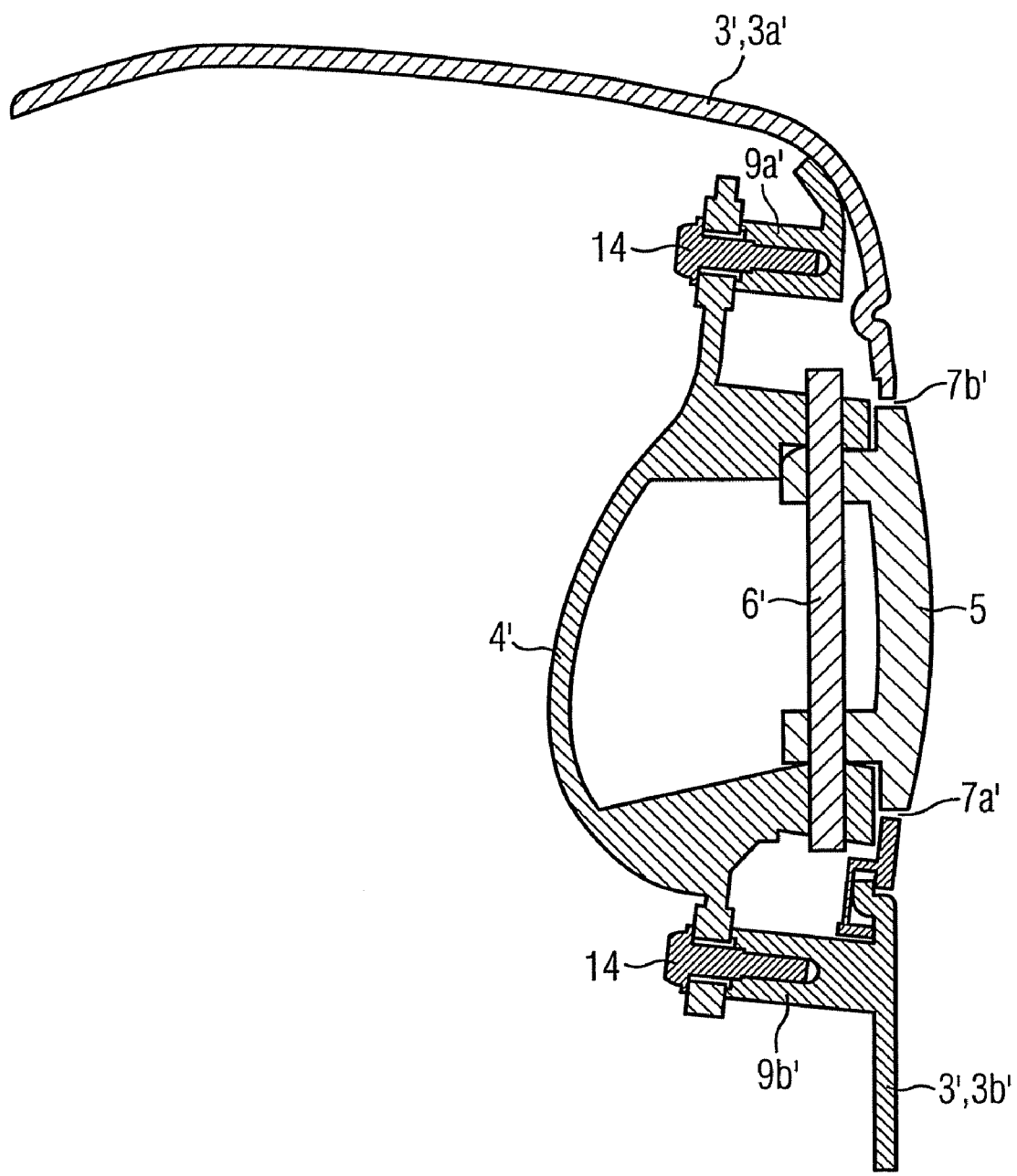

Finally a section according to FIG. 3 is shown for purposes of comparison. Here the parts are indicated with reference numerals corresponding to those of FIG. 2a. The bearing block 4' shown in FIG. 3 has an actuation lever 5 mounted via an arbor 6'. The screw domes 9a' and 9b' accommodate screws 14 which are guided through through-openings of the bearing block 4' and engage behind the bearing block 4'. The spring domes engage essentially with a positive fit into the through openings of the bearing block 4' so that its geometrical position has already been completely defined by way of this. A securement from detachment is finally effected by way of the screws 14.

The design has the disadvantage that the gaps 7a′ and 7b′ only have a satisfactory quality with regard to the dimensions when a multitude of components (screw dome 9a′, 9b′, bearing block 4′, arbor 6′, actuation lever 5) are machined in a very accurate manner and are also joined according to the directed manner. If errors occur in this relatively "long" tolerance chain this unavoidably leads to deviations in the dimensions with the gaps 7a′ and 7b′ which may manifest itself in an unsatisfactory optical appearance or may even lead to jamming of the actuation lever 5 on the trim 3a′ and 3b′.

The essential advantage of the design according to FIG. 2a is the fact that the tolerance chain, by way of the direct coupling via the fixation bearings 8a or 8b, is shortened towards the arbor 6 so that an excellent joint appearance arises without an expensive restriction of the tolerances.

The invention claimed is:

1. A vehicle door for a vehicle with an interior and an exterior, comprising a trim facing toward the vehicle interior, wherein the trim is connectable to a bearing block in which an actuation lever is pivotally mounted about a rotation arbor, and wherein a gap is, at least in regions, present between the actuation lever and the trim, and the arbor is additionally connected to the trim via fixation bearings.

2. The door according to claim 1, wherein the trim is polypropylene.

3. The door according to claim 2, wherein the trim is of several parts.

4. The door according to claim 3, wherein the trim consists of a first part and a second part which both have a surface directed to the vehicle interior.

5. The door according to claim 4, wherein the first part is an upper part which forms an inner window beltline of the vehicle, and the lower part is a base carrier which continues on downward from the first part to a lower edge of a door of the vehicle.

6. The door according to claim 5, wherein screw domes on the second part are arranged for the non-positive fastening of the bearing block on the second part, and that on the first part the fixation bearings are attached for the unambiguous positioning of the arbor with respect to the trim.

7. The door according to claim 6, wherein the bearing block is sunk with respect to the trim toward the vehicle exterior.

8. The door according to claim 7, wherein the bearing block is polyamide.

9. The door according to claim 8, wherein the fixation bearings are designed as receivers, open at one side.

10. The door according to claim 9, wherein the arbor is made of plastic or metal.

11. The door according to claim 10, wherein the actuation lever is made of polyamide.

12. The door according to claim 11, wherein the vehicle has a longitudinal axis along the length of the vehicle, and wherein the actuation lever, in the cross-sectional direction perpendicular to the vehicle longitudinal axis, terminates essentially flush with the trim.

* * * * *